United States Patent [19]

Hall

[11] Patent Number: 4,525,178
[45] Date of Patent: Jun. 25, 1985

[54] COMPOSITE POLYCRYSTALLINE DIAMOND

[75] Inventor: David R. Hall, Provo, Utah

[73] Assignee: Megadiamond Industries, Inc., Provo, Utah

[21] Appl. No.: 600,399

[22] Filed: Apr. 16, 1984

[51] Int. Cl.³ .............................................. B24D 3/02
[52] U.S. Cl. ........................................ 51/309; 51/293
[58] Field of Search ................................ 51/293, 309

[56] References Cited

U.S. PATENT DOCUMENTS

| | | | |
|---|---|---|---|
| 3,745,623 | 7/1973 | Wentorf | 29/95 |
| 4,156,329 | 5/1979 | Daniels et al. | 51/309 |
| 4,215,999 | 8/1980 | Phaal | 51/295 |
| 4,225,322 | 9/1980 | Knemeyer | 51/309 |
| 4,229,196 | 10/1980 | Wilson | 51/297 |
| 4,252,102 | 2/1981 | Phaal | 125/39 |
| 4,255,165 | 3/1981 | Dennis et al. | 51/309 |
| 4,303,442 | 12/1981 | Hara | 75/243 |
| 4,370,149 | 1/1983 | Hara | 51/309 |
| 4,411,672 | 10/1983 | Ishizuka | 51/309 |

Primary Examiner—Paul Lieberman
Assistant Examiner—Willie J. Thompson
Attorney, Agent, or Firm—Willian Brinks Olds Hofer Gilson & Lione Ltd.

[57] ABSTRACT

A composite material is described which includes a mixture of individual diamond crystals and pieces of precemented carbide. The mixture is heated and pressurized to create intercrystalline bonds between the diamond crystals and chemical bonds between the diamond crystals and the precemented carbide pieces. The resulting composite polycrystalline diamond body exhibits excellent wear characteristics and impact resistance.

29 Claims, 12 Drawing Figures

COMPOSITE POLYCRYSTALLINE DIAMOND

BACKGROUND OF THE INVENTION

1. Field of the Invention

This invention relates to a wear and impact resistant material which is comprised of polycrystalline diamond and cemented metal carbide formed at ultra high pressure and temperature.

As used in the following disclosure and claims, the term "polycrystalline diamond" is intended to refer to the type of material which is made by subjecting individual diamond crystals to ultra high pressure and temperature such that intercrystalline bonding occurs. Generally, a catalyst/binder material is used to ensure adequate intercrystalline bonding. This material is also often referred to as "sintered diamond" in the art. Also in the following disclosure and claims, the term "precemented carbide" is intended to refer to the type of material resulting when grains of a carbide of one of the group IVB, VB, or VIB metals is pressed and heated (most often in the presence of a binder such as Co, Ni, or Fe and various alloys thereof) to produce solid carbide pieces possessing high toughness. The most common and readily available form of precemented carbide is tungsten carbide containing a cobalt binder.

2. Prior Art

In several applications, polycrystalline diamond has displayed particular advantages over single crystal diamond. In particular, polycrystalline diamond is more impact resistant than single crystal diamond. Due to its extremely high modulus of elasticity, as well as its specific planes of cleavage in which relatively low forces can cause fracturing of the crystal, single crystal diamond has relatively low impact resistance. Polycrystalline diamond, which is made up of randomly oriented individual crystals, alleviates problems caused by the planes of cleavage in the single crystal form. However, polycrystalline diamond is still relatively low in impact resistance because of the high modulus of elasticity of diamond. This low impact resistance is a problem because in many applications polycrystalline diamond "wears" not from atom by atom shearing, but rather from fracturing and spalling occurring at both macro and microscopic scales.

The relative brittleness of polycrystalline diamond was recognized early, and as a result the first commercially available polycrystalline diamond products included a metallic backing layer or substrate bonded directly to the diamond layer, as shown in U.S. Pat. No. 3,745,623. The most common form of this "composite compact" to date has been a planar disc of polycrystalline diamond "grown" directly onto a precemented disc of tungsten carbide during a press cycle. However, this arrangement, in which the polycrystalline diamond layer is supported by a single precemented carbide mass or similar substrate, possesses a number of limitations.

One problem has been the limitation on the design of polycrystalline diamond tools to those configurations in which the diamond layer can be adequately supported by the carbide substrate. Although some work has been done to expand the applications (see for example U.S. Pat. No. 4,215,999 where a cylinder of polycrystalline diamond is grown around a core of precemented carbide) there are conceivable uses for polycrystalline diamond in tools which are difficult or impossible to implement with a composite compact because of the need to provide a substrate of precemented carbide for support. For example, rotary tools such as miniature grinding wheels and drills which need to be symmetrical about a line and in which the working faces are subject to tangential forces have not been commercially implemented.

Another problem arises because the precemented carbide substrate has a higher coefficient of thermal expansion than that of the polycrystalline diamond. Because the bond between the diamond layer and the precemented carbide substrate is formed when both materials are at a temperature in the range of 1,300°–2,000° C., stresses are created when the composite compact cools and the carbide substrate shrinks more than the diamond. Because the diamond layer is less elastic than the carbide substrate, these stresses often cause cracking in the diamond layer, either during the cooling phase or during use of the composite compact. Also, the precemented carbide substrate takes up room in the pressing cell that could otherwise be used for the formation of polycrystalline diamond.

Furthermore, when a precemented carbide mass is relied on to increase the impact resistance of polycrystalline diamond, the diamond layer is preferably relatively thin so that the diamond is never too far from its support. This restriction on the thickness of the diamond layer naturally limits both the life expectancy of the composite compact in use and the potential designs for polycrystalline diamond tools.

Yet another problem which has limited the thickness of the diamond layer in composite compacts is caused by the problem of "bridging". Bridging refers to the phenomenon that occurs when a fine powder is pressed from multiple directions. It is observed that the individual particles in a powder being pressed tend to stack up and form arches or "bridges" so that the full amount of pressure often does not reach the center of the powder being pressed. The inventor has observed that when a 1 micron diamond powder is used to make a polycrystalline diamond body which is more than about 0.06 inches thick, the polycrystalline diamond toward the center of the piece is usually not as well formed as the exterior portions of the polycrystalline diamond, a condition which can result in cracking and chipping of the diamond layer.

OBJECTS OF THE INVENTION

A general object of this invention is to provide a polycrystalline diamond body having improved impact resistance. It is another general object of this invention to provide such a polycrystalline diamond body with improved impact resistance which also does not have the problems and disadvantages associated with the composite compacts described above.

It is a specific object of the present invention to circumvent the previously existing design limitations as to thickness and geometry for polycrystalline diamond tools by providing a polycrystalline diamond body which does not depend on external support from a single substrate. It is another specific object of the present invention to reduce problems caused by the stresses otherwise present at the diamond/cemented carbide interface of the prior art composite compact. It is yet another specific object of the present invention to alleviate problems caused by bridging in the diamond powder during pressing.

SUMMARY OF THE INVENTION

The present invention is directed to a composite polycrystalline diamond body having precemented carbide masses dispersed in the composite. In particular, the composite polycrystalline diamond body of the present invention comprises polycrystalline diamond formed in the presence of pieces of precemented carbide at high pressure and temperature. The pieces of precemented carbide are preferably larger than the starting size of the individual diamond crystals used to form the polycrystalline diamond.

The pieces of precemented carbide used in the invention may comprise grains of carbide of one or more of the following metals: Ti, Zr, Hf, V, Nb, Ta, Cr, Mo, or W. Also, the metal carbides used in the present invention may contain a binder such as Ni, Co, Fe, or alloys thereof. It is also possible that the precemented metal carbide can be heated and pressed without the aid of a binder. Because of its wide availability and superior properties, a cobalt bonded tungsten carbide is preferably used.

The shapes and sizes of the pieces of precemented carbide used to produce the composite body of the present invention may be varied to suit particular applications. Another important variable is the weight percent of precemented carbide in relation to the weight percent of polycrystalline diamond. The inventor has found that the weight percent of the precemented carbide can range from slightly greater than 0% to slightly less than 100%. Varying this weight percent allows specific properties of the composite to be tailored to fit the needs of particular applications.

The particular placement of the precemented carbide within the polycrystalline diamond may also be controlled with the present invention. That is, the location of the carbide within the piece may be preselected to optimize performance.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
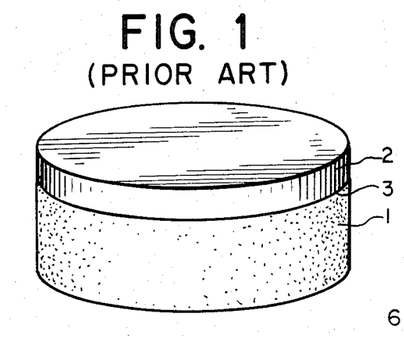
FIG. 1 illustrates an example of a prior art composite compact.

Turning now to the drawings, FIG. 1 illustrates a prior art composite compact which is made up of a layer 1 of polycrystalline diamond supported by a cemented carbide backing or substrate 2. The diamond layer 1 is comprised of individual diamond crystals that have been subjected to sufficient heat and pressure to cause intercrystalline bonding. The cemented cabide backing 2 is intimately bonded to the diamond layer 1 at the interface 3. There is a strong chemical bond formed during the press cycle at the interface 3 between the two layers 1,2. Because the cemented carbide backing 2 shrinks more than the diamond layer 1, residual stresses are set up between the two layers which can cause premature cracking in the diamond layer 1.

Figure 2:
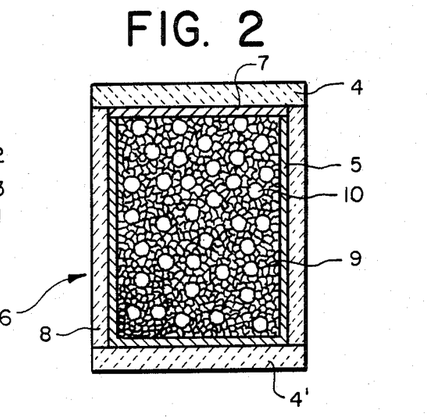
FIG. 2 is a cross-section of a sample cell used to fabricate a preferred embodiment of the composite polycrystalline diamond body of this invention.

FIG. 2 shows a cross-section of a pressing unit 6 that may be employed to make the composite polycrystalline diamond body of the present invention. The pressing unit 6 is cylindrical in shape and is designed to fit within the central cavity of an ultra high pressure and temperature cell such as that described in U.S. Pat. No. 3,913,280 (for use in cubic presses) or U.S. Pat. No. 3,745,623 (for use in "belt" type presses). The pressing unit 6 includes a hollow tube 8 of pressed NaCl. Discs 4,4' of pressed NaCl are placed on the top and bottom of the tube 8. Within the tube 8 is a protective metal enclosure 5 which is also cylindrical in shape and closed at the bottom end. This enclosure 5 is preferably made from molybdenum because of its high melt temperature, but other metals such as zirconium or tantalum also work well. A disc 7, usually comprising the same metal as the enclosure 5, is placed as a lid on the top of the enclosure 5.

A mass of diamond crystals 9 is placed within the protective metal enclosure 5 of the pressing unit 6. A catalyst/binder such as cobalt powder may be mixed into the diamond powder to aid in the formation of the polycrystalline body. According to this invention, a plurality of pieces of precemented carbide 10 are dispersed through this mass of diamond crystals 9.

The size of the diamond crystals 9 may be varied to suit the needs of particular applications. Such variation in diamond crystal size is well-known in the art as it relates to composite compacts, and therefore is not described in detail here. In many applications, the diamond crystals 9 are preferably at most one-third the size of the precemented carbide pieces 10. This size ratio appears to reduce the interference with intercrystalline growth between adjacent diamond crystals 9. In other words, if the precemented carbide pieces 10 were the same size or smaller than the diamond crystals 9, then the carbide pieces 10 would more often be found between the diamond crystals 9, thus acting as an inhibitor to intercrystalline growth. In contrast, when the precemented carbide pieces 10 are larger than the crystals 9, there appears to be less interference with intercrystalline growth.

The precemented carbide pieces 10 in FIG. 2 are spherical in shape. This shape is preferred for some embodiments because the spherical shape will best allow the precemented carbide pieces 10 to absorb impact forces. However, the invention is not limited to the use of spherical pieces of precemented carbide 10. For instance, irregular shapes such as those shown in other figures may be used in other embodiments.

It is a requirement of the present invention that the carbide pieces 10 be precemented, i.e., that they have already been pressed and heated before being placed in the high pressure cell. Because the carbide pieces are already cemented, they undergo very little shrinkage during the press cycle for the composite polycrystalline diamond body. It has been the inventor's observation that, in making composite compacts with a single precemented carbide backing, the polycrystalline diamond formed nearest to the precemented carbide backing in the prior art was usually superior (i.e., more wear-resistant) to that formed further from the backing. It is now thought that because the precemented carbide pieces 10 in the present invention do not significantly compress during the press cycle, they improve the distribution of pressure through the reaction chamber, thereby improving the formation of the polycrystalline diamond in the present invention. In particular, these precemented carbide pieces prove beneficial to the formation of the polycrystalline diamond because they provide hard surfaces against which the diamond crystals can be pressed. The result is that instead of having only pressure applied to the diamond from the external anvils of the press, the inclusion of the precemented carbide pieces within the polycrystalline diamond body provides a large number of "mini-anvils" against which the diamond is pressed. Additionally, this improved distribution of pressure in the cell alleviates the problem of bridging in the diamond powder during pressing. The present invention thereby allows for the manufacture of polycrystalline diamond bodies of greater thickness.

Figure 3:
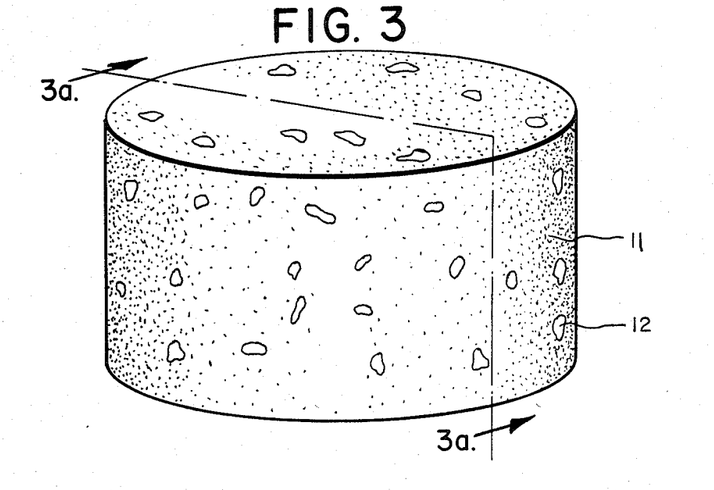
FIG. 3 depicts a first preferred embodiment of the composite polycrystalline diamond body of the present invention containing precemented carbide pieces of irregular shape.

FIG. 3 is a perspective view of a first embodiment of the composite body of the present invention. A polycrystalline diamond matrix 11 comprises the majority of the volume of the polycrystalline body of FIG. 3. Pieces of precemented carbide 12 have been dispersed through the polycrystalline diamond matrix 11 and are chemically bonded therein. These carbide pieces 12 serve the important function of absorbing impact forces in the polycrystalline diamond matrix 11. This is accomplished because the modulus of elasticity of the precemented carbide pieces 12 is lower than that of the polycrystalline diamond matrix 11.

Another advantage of the present invention is increased attachability of the composite polycrystalline diamond body. Since diamond is relatively non-wettable, it is hard to attach materials directly to diamond. As a result, composite compacts of the prior art are usually attached by brazing to their cemented carbide backing. However, in the present invention it has been found that it is possible to achieve good attachment by brazing directly to the composite polycrystalline diamond body. This is possible because the braze is actually attaching to exposed pieces of precemented carbide. This ability to braze directly to the composite polycrystalline body allows greater freedom in the design of polycrystalline diamond tools (e.g., tools which require attachment to more than one side of the polycrystalline body).

Figure 3A:
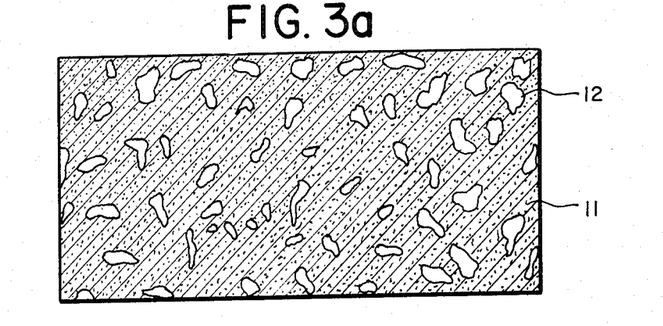
FIG. 3a is a cross-sectional view taken along line 3a—3a of FIG. 3.

FIG. 3a is a cross-section of the composite polycrystalline diamond body of FIG. 3, showing the random distribution of the irregularly shaped precemented carbide pieces 12 through the polycrystalline diamond matrix 11. It should be noted that the pieces of precemented carbide 12 are depicted as being relatively large in this illustration. This is done for convenience and clarity in this drawing and several others. However, as explained further in the accompanying examples, the pieces of precemented carbide 12 may be much smaller; so small that they are actually not be visible without the aid of magnification.

Figure 4:
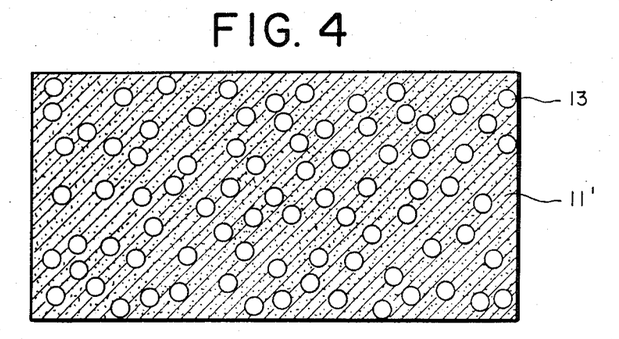
FIG. 4 is a cross-sectional view of a second preferred embodiment of the composite polycrystalline diamond body of this invention containing spherical pieces of precemented carbide.

FIG. 4 is a cross-section of a second embodiment of the present invention. In this embodiment precemented carbide pieces 13 of spherical shape are distributed throughout a polycrystalline diamond matrix 11'. As mentioned, this embodiment has particular advantages because of the basic toughness of a spherical shape against impact forces. This drawing also shows a higher weight percentage of precemented carbide pieces 13 than FIG. 3a. It has been found that the weight percentage of the precemented carbide pieces can be varied anywhere from slightly greater than 0% to slightly less than 100%.

Figure 5:
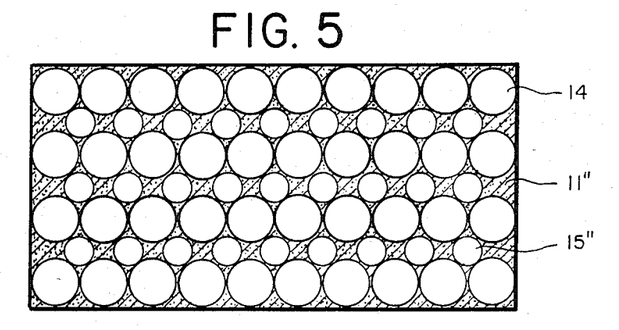
FIG. 5 is a cross-sectional view of a third preferred embodiment of the composite polycrystalline diamond body of this invention, wherein the precemented carbide pieces are relatively large and comprise the majority of the volume of the composite body.

FIG. 5 is a cross-section of a third embodiment which shows an even higher weight percentage of precemented carbide pieces 14,15 distributed in a polycrystalline diamond matrix 11". To achieve this weight percentage of precemented carbide pieces 14,15, larger spheres 14 of precemented carbide were packed with smaller spheres 15 of precemented carbide. The matrix of polycrystalline diamond 11" was formed between these precemented carbide pieces 14,15. Embodiments with a high weight percentage of precemented carbide pieces appear to be particularly well suited for applications where high impact resistance for the composite polycrystalline body is needed. For example, drilling in rock formations subjects a polycrystalline body to extreme impact forces. It should also be noted that the embodiment of FIG. 5 will provide aggressive cutting action because the shape and size of the precemented carbide pieces 14,15 produces sharp edges in the polycrystalline diamond matrix 11" between the carbide pieces 14,15. Because the carbide pieces 14,15 wear away faster than the diamond matrix 11", the aggressive cutting profiles of the matrix 11" are continually exposed. It is also possible to use different shapes and sizes of precemented carbide pieces that allow further control over the shape and size of the polycrystalline diamond matrix formed therebetween.

Figure 6:
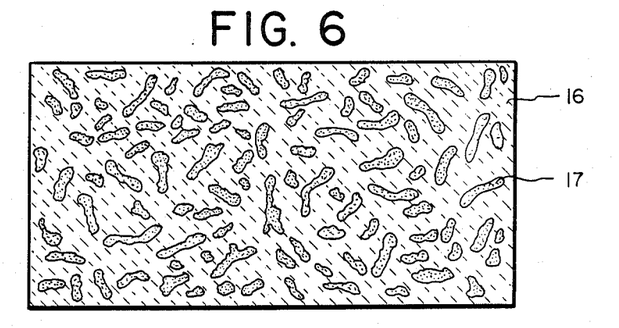
FIG. 6 is a cross-sectional view of a fourth preferred embodiment of a composite polycrystalline diamond with a high volume percentage of precemented carbide wherein the grains of precemented carbide have fused together and the polycrystalline diamond has formed in gaps between the carbide.

FIG. 6 is a cross-section of a fourth embodiment in which a greater number of smaller grains of precemented carbide were placed in the high pressure cell 4. This approach results in the formation of a fused matrix 16 of precemented carbide pieces. The individual crystals of diamond (which are even smaller than the grains of precemented carbide) have grown together resulting in a large number of masses of polycrystalline diamond 17 dispersed within the gaps of the precemented carbide matrix 16. It has been observed that even when the diamond powder and precemented carbide grains are well mixed the diamond to some extent tends to conglomerate, thereby producing pockets of polycrystalline diamond 17 within the fused carbide matrix 16. This embodiment involves an even higher weight percentage of precemented carbide and is particularly well suited for the most impact-prone applications. Surprisingly, even when there is such a low weight percentage of polycrystalline diamond, the wear resistance of the composite body is much higher than a cemented carbide piece. That is, even at a low weight percentage, the polycrystalline diamond contributes substantially to the wear resistance of the composite body, as pointed out below in conjunction with FIG. 10. This embodiment also provides an aggressive cutting action.

Figure 6A:
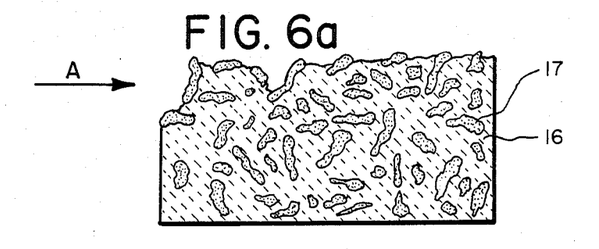
FIG. 6a shows the polycrystalline body of FIG. 6 after having undergone some use.

FIG. 6a shows a partial cross-sectional view of the embodiment of FIG. 6 after it has been in use. Arrow A shows the principal direction of force against the tool. As shown, the cemented carbide matrix 16 wears faster than the masses of polycrystalline diamond 17. This results in the polycrystalline diamond 17 being well exposed for aggressive cutting action. That is, the working surface area of the composite body is kept relatively low, thus allowing for higher force to surface ratios. Also, because the polycrystalline diamond 17 is chemically bonded to the cemented carbide matrix 16, it does not become dislodged as easily as single crystal diamonds do in the prior art metal matrix applications. This is because diamond is relatively nonwettable. Therefore, single crystal diamonds that are set into a metal matrix to make, for example, segments for rock cutting saws are primarily held in place by mechanical forces and often fall out of the metal matrix once more than half of the crystal is exposed. Since the polycrystalline diamond 17 is chemically bonded to the cemented carbide matrix 16, more of the matrix 16 can wear away before the polycrystalline diamond 17 becomes dislodged, thereby providing more exposure and resulting in a more aggressive cutting action.

From the description of the foregoing embodiments it should be clear that the properties of the composite polycrystalline bodies of this invention can be tailored to suit a wide range of applications. The weight percentage of precemented carbide can be increased if increased impact resistance is required. Also, the size of either the masses of polycrystalline diamond bodies or the masses of precemented carbide can be varied to achieve different properties such as longer wear resistance, more aggressive cutting action, or better finish.

Figure 7:
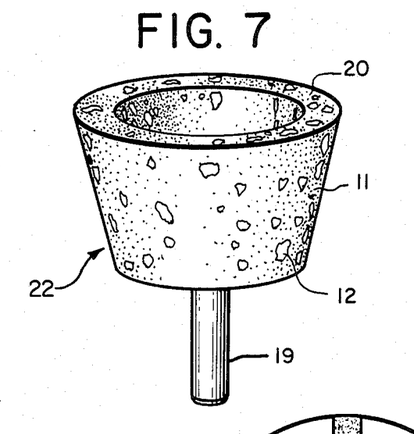
FIG. 7 is a perspective view of a composite polycrystalline diamond body of the present invention as used in a miniature grinding wheel.
Figure 8:
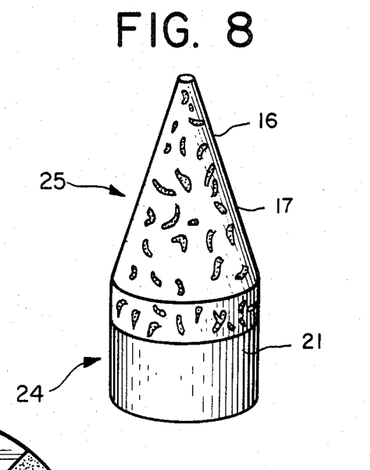
FIG. 8 is a perspective view of a composite polycrystalline diamond body of the present invention as used in a miniature drill.
Figure 9:
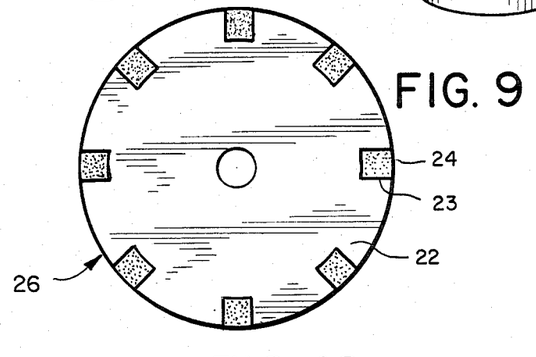
FIG. 9 is a plan view of a circular saw blade for cutting concrete and the like which incorporates cutting segments made according to the present invention.

Furthermore, it should be noted that the composite polycrystalline diamond bodies of this invention can be molded, by well-known technology, into different shapes and sizes and may also be cut by well-known means to produce different shapes for particular applications. FIGS. 7-9 illustrate particular applications of the present invention where some of these properties have been so tailored.

FIG. 7 is a perspective view of a polycrystalline miniature grinding wheel 22 made according to the present invention. This grinding wheel 22 utilizes the composite polycrystalline diamond body of FIG. 3, suitably shaped either by a molding operation during the press cycle or by any suitable means of cutting and shaping after the pressing. The majority of the volume of the grinding wheel 22 is made up of a polycrystalline diamond matrix 11, within which are distributed pieces of precemented carbide 12. These pieces 12 increase the impact strength of the wheel 22. They are also important in allowing the production of this relatively thick body of polycrystalline diamond. The grinding wheel 22 also includes a stem 19, which can be attached to the polycrystalline body either during or after the pressing cycle by known techniques, and a cutting edge 20. Because the weight percentage of the polycrystalline diamond matrix 11 is relatively high, the grinding wheel 22 has relatively high wear resistance. The smoothness of finish or the aggressiveness of the cutting action can be controlled by altering the size of the precemented carbide pieces 12.

FIG. 8 is a perspective drawing of a small drill 24 (such as a dentist's drill) made according to the present invention. This drill 24 includes a base portion 21 and an upper portion 25. The base portion 21 may be formed of a suitable metal and attached to the upper portion 25 either during the press cycle or after the press cycle by known methods, such as brazing. The upper portion 25 is comprised of a fused matrix of precemented carbide 16 containing pockets of polycrystalline diamond 17 such as shown in FIG. 6. This composition provides a highly impact-resistant tool which imparts a fine finish because of its relatively small inclusions of polycrystalline diamond 17.

FIG. 9 shows a circular saw blade 26 for cutting hard materials such as concrete and the like. This saw blade 26 includes a steel disk 22 which defines slots 23 sized to receive a plurality of cutting segments 24. Each of the segments 24 is a composite polycrystalline diamond body made in accordance with the present invention. These segments 24 have been either molded, cut or otherwise formed into the proper size and shape for the saw blade 26. It is expected that the embodiment of FIG. 7 will work particularly well in this application because of its aggressive cutting action.

EXAMPLES

Example 1

A powder of diamond crystals ranging in size from 0.25 to 120 microns was mixed with precemented tungsten carbide grit. The precemented carbide grit contained approximately 16% cobalt binder and was obtained from Dynalloy, Inc. and consisted of irregularly shaped pieces of carbide ranging in size from 0 to 120 U.S. mesh. The mixture was 90% by weight diamond (including 13% cobalt catalyst/binder, or 11.7% of the total mixture) and 10% precemented carbide. This mixture was placed on top of a disc of cemented tungsten carbide in a pressing unit of the type shown in FIG. 2 and pressurized to 60 Kbar and 1,450° C. for 1 minute. The composite polycrystalline diamond body recovered was a fully dense mass of polycrystalline diamond with pieces of cemented tungsten carbide dispersed throughout the mass, which was directly bonded to the cemented tungsten carbide disc. The resulting piece was 0.50 inches in diameter, and the composite layer and the disc were each 0.125 inches in thickness.

Example 2

A powder of diamond crystals ranging in size from 0.25 to 120 microns was mixed with precemented tungsten carbide grit ranging in size from 0 to 120 U.S. mesh. The precemented carbide grit contained approximately 16% cobalt binder and was obtained from the same source as in Example 1. The mixture was 50% by weight diamond (including 13% cobalt catalyst/binder, or 6.5% of the total mixture) and 50% precemented carbide. This mixture was placed on a tungsten carbide disc in a pressing unit of the type shown in FIG. 2 and pressurized to 60 Kbar and 1,450° C. for 1 minute. The composite polycrystalline diamond body recovered was a fully dense mass of polycrystalline diamond and cemented tungsten carbide directly bonded to the tungsten carbide disc and of the same dimensions as the body in Example 1.

EXAMPLE 3

The steps of Example 1 were repeated as described above, except that the mixture was 15% by weight diamond (including 13% cobalt catalyst/binder, or 1.9% of the total mixture) and 85% by weight precemented carbide. The composite body recovered was a fully dense mass of cemented tungsten carbide with pockets of polycrystalline diamond within it.

Example 4

The steps of Example 1 were repeated as described above, except that the mixture was 5% by weight diamond (including 13% cobalt catalyst/binder, or 0.65% of the total mixture) and 95% by weight precemented carbide. The composite body recovered was a fully dense mass of cemented tungsten carbide with pockets of polycrystalline diamond within it.

Example 5

The steps of Example 1 were repeated as described above, except that the mixture was 1% by weight diamond (including 13% cobalt catalyst/binder, or 0.13% of the total mixture) and 99% by weight precemented carbide. The composite body recovered was a fully dense mass of cemented tungsten carbide with pockets of polycrystalline diamond within it.

As noted, the numbered examples above were all pressed adjacent to a cemented carbide substrate. The primary reason for the inclusion of the substrate was to obtain consistency in the comparison of these embodiments of the invention with commercially available carbide backed polycrystalline diamond compacts.

Similar tests have been performed with diamond/carbide weight ratios of 80/20 and 40/60, thereby establishing that the diamond/carbide weight ratio can be adjusted as desired to obtain the desired characteristics. It has also been observed that, in all of these tests, no cracking occurred during the cooling and decompression of the resultant composite body. This is in sharp contrast to prior art composite compacts, in which the diamond layer is formed from 100% (including catalyst/binder) diamond, where such cracking often occurs. This absence of cracking with the present invention represents a significant improvement in the efficiency of production.

Also, composite polycrystalline diamond bodies have been made according to the present invention wherein the precemented carbide comprised a mixture of tungsten carbide and tantalum carbide.

WEAR TEST RESULTS

The materials produced in the Examples 1–5 above were tested for wear in the following manner. A log of grey barre granite 8 inches in diameter was rotated at 160 rpm. The composite materials produced in each of the examples were applied against the turning granite log with an in feed of 0.010 inches and a cross travel of 0.0125 inches per revolution. The cutters were cooled by water. In addition, a commercially available polycrystalline diamond blank (i.e., 100% diamond including catalyst/binder) and a commercially available cemented tungsten carbide blank were likewise tested.

For comparison, the wear ratio (i.e., the volume of granite removed divided by the volume of cutting material consumed) was recorded for each, and these wear ratios are reproduced in the following table.

TABLE I

| Weigh Percent Diamond | Volume Granite Removed/ Volume Cutter Worn |
| --- | --- |
| 100 (standard polycrystalline diamond) | 2,800,000 |
| 90 | 3,500,000 |
| 50 | 1,500,000 |
| 15 | 150,000 |
| 5 | 32,600 |
| 1 | 12,100 |
| 0 (standard tungsten carbide) | 4,900 |

Figure 10:
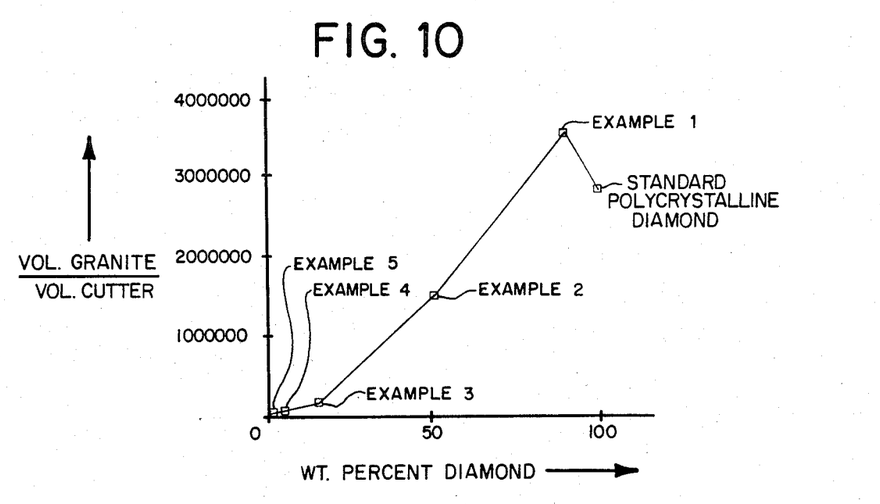
FIG. 10 is a graph of the results of wear tests performed on embodiments of the present invention and the prior art.

These results are shown in the graph of FIG. 10, in which the wear ratio is shown on the Y axis and the percentage by weight of diamond in the material is shown on the X axis.

It was surprising to the inventor that composite bodies made with 10% precemented carbide pieces performed 25% better than those with 0% carbide. It is presently thought that this result is due to the increased impact resistance of the piece which lessens the amount of fracturing, as well as to the beneficial pressing effects of the precemented carbide on the formation of the polycrystalline diamond material. It was also surprising to find that a cemented carbide piece with only 15% by weight polycrystalline diamond performed 30 times better than a cemented carbide piece without any polycrystalline diamond. It was further surprising to find that a cemented carbide piece with only 1% by weight polycrystalline diamond performed 2.5 times better than a standard cemented carbide piece.

From the foregoing it should be apparent that an improved composite material has been described which provides excellent properties for use in a variety of applications. Of course, it sould be understood that a wide range of changes and modifications to the preferred embodiments described above will be apparent to those skilled in the art. It is therefore intended that the foregoing detailed description be regarded as illustrative rather than limiting, and that it be understood that it is the following claims, including all equivalents, which are intended to define the scope of this invention.

I claim:

1. A composite material comprising:
   a mixture of diamond crystals and precemented carbide pieces formed under sufficient heat and pressure to create a composite polycrystalline body in which adjacent diamond crystals are bonded together and to the precemented carbide pieces, and in which the diamond crystals and the precemented carbide pieces are interspersed in one another, either the carbide pieces or diamond crystals providing a matrix for the composite material.

2. The invention of claim 1 wherein the weight percentage of the diamond crystals in the mixture is less than 50 percent.

3. The invention of claim 1 wherein the weight percentage of the diamond crystals in the mixture is less than 15 percent.

4. The invention of claim 1 wherein the weight percentage of the diamond crystals in the mixture is less than 5 percent.

5. The invention of claim 1 wherein the weight percentage of the diamond crystals in the mixture is in the range of about 40 to about 70 percent.

6. The invention of claim 1 wherein the weight percentage of the diamond crystals in the mixture is greater than 70%.

7. The invention of claim 1 wherein the diamond crystals are characterized by an average cross-sectional dimension less than that of the precemented carbide pieces.

8. The invention of claim 1 wherein the precemented carbide pieces are irregularly shaped.

9. The invention of claim 1 wherein the precemented carbide pieces are regularly shaped.

10. The invention of claim 9 wherein the precemented carbide pieces are substantially spherically shaped.

11. The invention of claim 1 wherein the precemented carbide pieces comprise tungsten carbide.

12. A composite material comprising:
a polycrystalline diamond matrix formed of individual diamond crystals and having discrete pieces of precemented carbide intermixed with the individual diamond crystals and distributed throughout at least a portion of the polycrystalline diamond matrix, said individual diamond crystals bonded together and to the precemented carbide pieces under sufficient heat and pressure to form a dense, abrasion-resistant mass.

13. The invention of claim 12 wherein the weight percentage of the diamond matrix in the material is greater than 80 percent.

14. The invention of claim 12 wherein the weight percentage of the diamond matrix in the material is less than 50 percent.

15. The invention of claim 12 wherein the weight percentage of the diamond matrix in the material is about 90%.

16. The invention of claim 12 wherein the individual diamond crystals are characterized by an average cross-sectional dimension less than that of the precemented carbide pieces.

17. The invention of claim 12 wherein the precemented carbide pieces are irregularly shaped.

18. The invention of claim 12 wherein the precemented carbide pieces are regularly shaped.

19. The invention of claim 18 wherein the precemented carbide pieces are substantially spherically shaped.

20. The invention of claim 12 wherein the precemented carbide pieces comprise tungsten carbide.

21. A composite material comprising:
a precemented carbide matrix formed of individual pieces of precemented carbide and having individual diamond crystals bonded together to form polycrystalline diamond masses intermixed with the individual pieces of precemented carbide and distributed throughout at least a portion of the precemented carbide matrix, said precemented carbide pieces and individual diamond crystals bonded together under sufficient heat and pressure to form a dense, abrasion-resistant mass.

22. The invention of claim 21 wherein the weight percentage of the precemented carbide matrix in the material is greater than 70 percent.

23. The invention of claim 21 wherein the weight percentage of the precemented carbide matrix in the material is greater than 85 percent.

24. The invention of claim 21 wherein the weight percentage of the precemented carbide matrix in the material is greater than 95 percent.

25. The invention of claim 21 wherein the individual diamond crystals are characterized by an average cross-sectional dimension less than that of the precemented carbide pieces.

26. The invention of claim 21 wherein the precemented carbide pieces are irregularly shaped.

27. The invention of claim 21 wherein the precemented carbide pieces are regularly shaped.

28. The invention of claim 27 wherein the precemented carbide pieces are substantially spherically shaped.

29. The invention of claim 21 wherein the precemented carbide pieces comprise tungsten carbide.

* * * * *

REEXAMINATION CERTIFICATE (1226th)
United States Patent [19]
Hall

[11] B1 4,525,178
[45] Certificate Issued  Mar. 27, 1990

[54] COMPOSITE POLYCRYSTALLINE DIAMOND

[75] Inventor: David R. Hall, Provo, Utah

[73] Assignee: Megadiamond Industries, Inc., Provo, Utah

Reexamination Request:
No. 90/001,616, Oct. 12, 1988

Reexamination Certificate for:
Patent No.: 4,525,178
Issued: Jun. 25, 1985
Appl. No.: 600,399
Filed: Apr. 16, 1984

[51] Int. Cl.[4] ............................................. B24D 3/02
[52] U.S. Cl. ....................................... 51/309; 51/293
[58] Field of Search ................................ 51/293, 309

[56] References Cited
U.S. PATENT DOCUMENTS

| | | | |
|---|---|---|---|
| 4,171,973 | 10/1979 | Hara et al. | 51/307 |
| 4,231,762 | 11/1980 | Hara et al. | 51/309 |
| 4,370,149 | 1/1983 | Hara et al. | 51/309 |

FOREIGN PATENT DOCUMENTS

| | | |
|---|---|---|
| 2927079 | 4/1979 | Fed. Rep. of Germany . |
| 2024843 | 1/1980 | United Kingdom . |

*Primary Examiner*—Paul Lieberman

[57] ABSTRACT

A composite material is described which includes a mixture of individual diamond crystals and pieces of precemented carbide. The mixture is heated and pressurized to create intercrystalline bonds between the diamond crystals and chemical bonds between the diamond crystals and the precemented carbide pieces. The resulting composite polycrystalline diamond body exhibits excellent wear characteristics and impact resistance.

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 12 and 21 are determined to be patentable as amended.

Claims 2-11, 13-20 and 22-29, dependent on an amended claim, are determined to be patentable.

New claims 30 and 31 are added and determined to be patentable.

1. A composite material [comprising] *prepared from:*
a mixture of diamond crystals and precemented carbide pieces, *said composite* formed under sufficient heat and pressure to create [a] *said* composite polycrystalline body in which adjacent diamond crystals are bonded together and to the precemented carbide pieces, and in which the diamond crystals and the precemented carbide pieces are interspersed in one another, either the carbide pieces or diamond crystals providing a matrix for the composite material, *wherein the precemented carbide pieces are a second composite material resulting from heating grains of carbide of metal selected from the group consisting of titanium, zirconium, hafnium, vanadium, niobium, tantalum, chromium, molybdenum and tungsten, with a binder of metal selected from the group consisting of nickel, cobalt, iron, and alloys thereof, before the first mentioned composite material is formed.*

12. A composite material comprising:
a polycrystalline diamond matrix formed of individual diamond crystals and having discrete pieces of precemented carbide [intermixed with] *bonded to* the individual diamond crystals and distributed throughout at least a portion of the polycrystalline diamond matrix, said individual diamond crystals *having been* bonded together and to the precemented carbide pieces under sufficient heat and pressure to form a dense, abrasion-resistant mass, *wherein the precemented carbide pieces are a second composite material resulting from heating grains of carbide of metal selected from the group consisting of titanium, zirconium, hafnium, vanadium, niobium, tantalum, chromium, molybdenum and tungsten, with a binder of metal selected from the group consisting of nickel, cobalt, iron, and alloys thereof, before the first mentioned composite material is formed.*

21. A composite material comprising:
a precemented carbide matrix formed of individual pieces of precemented carbide and having individual diamond crystals bonded together to form polycrystalline diamond masses [intermixed with] *bonded to* the individual pieces of precemented carbide and distributed throughout at least a portion of the precemented carbide matrix, said precemented carbide pieces and individual diamond crystals *having been* bonded together under sufficient heat and pressure to form a dense, abrasion-resistant mass, *wherein the precemented carbide pieces are a second composite material resulting from heating grains of carbide of metal selected from the group consisting of titanium, zirconium, hafnium, vanadium, niobium, tantalum, chromium, molybdenum and tungsten, with a binder of metal selected from the group consisting of nickel, cobalt, iron, and alloys thereof, before the first mentioned composite material is formed.*

*30. The first mentioned composite material of claim 1 wherein the precemented carbide pieces are present in the range of from 10 to 85% by weight.*

*31. The first mentioned composite material of claim 12 wherein the precemented carbide pieces are present in the range of from 10 to 85% by weight.*

* * * * *